US012448664B2

(12) United States Patent
Grigorieva et al.

(10) Patent No.: US 12,448,664 B2
(45) Date of Patent: Oct. 21, 2025

(54) PRESS HARDENING METHOD

(71) Applicant: ArcelorMittal, Luxembourg (LU)

(72) Inventors: Raisa Grigorieva, Metz (FR); Florin Duminica, Tilff (BE); Brahim Nabi, Leuven (BE); Pascal Drillet, Rozérieulles (FR); Thierry Sturel, Le Ban Saint Martin (FR)

(73) Assignee: ArcelorMittal, Luxembourg (LU)

( * ) Notice: Subject to any disclaimer, the term of this patent is extended or adjusted under 35 U.S.C. 154(b) by 451 days.

(21) Appl. No.: 17/771,908

(22) PCT Filed: Oct. 20, 2020

(86) PCT No.: PCT/IB2020/059842
§ 371 (c)(1),
(2) Date: Apr. 26, 2022

(87) PCT Pub. No.: WO2021/084379
PCT Pub. Date: May 6, 2021

(65) Prior Publication Data
US 2022/0380863 A1 Dec. 1, 2022

(30) Foreign Application Priority Data
Oct. 30, 2019 (WO) .................. PCT/IB2019/059288

(51) Int. Cl.
| | |
|---|---|
| C21D 9/46 | (2006.01) |
| B21D 22/02 | (2006.01) |
| B32B 15/01 | (2006.01) |
| C21D 1/74 | (2006.01) |
| C21D 7/13 | (2006.01) |
| C21D 8/02 | (2006.01) |
| C23C 2/26 | (2006.01) |
| C23C 2/28 | (2006.01) |
| C22C 18/04 | (2006.01) |
| C22C 21/10 | (2006.01) |

(52) U.S. Cl.
CPC .............. *C21D 9/46* (2013.01); *B21D 22/022* (2013.01); *B32B 15/012* (2013.01); *B32B 15/015* (2013.01); *C21D 1/74* (2013.01); *C21D 7/13* (2013.01); *C21D 8/0205* (2013.01); *C23C 2/26* (2013.01); *C23C 2/261* (2022.08); *C23C 2/28* (2013.01); *C23C 2/29* (2022.08); *C21D 2211/005* (2013.01); *C21D 2211/008* (2013.01); *C22C 18/04* (2013.01); *C22C 21/10* (2013.01)

(58) Field of Classification Search
CPC ....................................................... C21D 9/46
See application file for complete search history.

(56) References Cited

U.S. PATENT DOCUMENTS

| | | | |
|---|---|---|---|
| 6,336,349 B1 | 1/2002 | Hauger et al. | |
| 11,319,623 B2* | 5/2022 | Van Schoonevelt | .... C22C 38/02 |
| 2011/0165436 A1 | 7/2011 | Drillet et al. | |
| 2014/0134450 A1 | 5/2014 | Eberlein | |
| 2015/0165727 A1 | 6/2015 | Harako et al. | |
| 2015/0337406 A1* | 11/2015 | Muhr | ...................... C25D 17/00 |
| | | | 266/160 |
| 2016/0017452 A1 | 1/2016 | Puerta Velasquez et al. | |
| 2016/0122889 A1 | 5/2016 | Muhr | |
| 2016/0222484 A1 | 8/2016 | Koyer et al. | |
| 2016/0237585 A1 | 8/2016 | Eberlein et al. | |
| 2017/0029918 A1 | 2/2017 | Panier et al. | |
| 2017/0073789 A1 | 3/2017 | Schuhmacher et al. | |
| 2017/0253941 A1 | 9/2017 | Cob et al. | |
| 2018/0044774 A1 | 2/2018 | Allely et al. | |
| 2018/0223409 A1* | 8/2018 | Allely | ..................... C23C 30/00 |
| 2021/0254189 A1 | 8/2021 | An et al. | |

FOREIGN PATENT DOCUMENTS

| | | |
|---|---|---|
| CN | 101215708 A | 7/2008 |
| CN | 106574348 A | 4/2017 |
| CN | 101120114 A | 2/2018 |
| CN | 107849673 A | 3/2018 |
| CN | 109072450 A | 12/2018 |
| CN | 109821951 A | 5/2019 |
| DE | 102013010025 A1 | 12/2014 |
| EP | 1074317 | 2/2001 |
| EP | 2312005 | 4/2011 |
| EP | 2377965 A2 | 10/2011 |

(Continued)

OTHER PUBLICATIONS

Search Report of PCT/IB2020/0059838 dated Aug. 12, 2020.

(Continued)

*Primary Examiner* — Jophy S. Koshy

(74) *Attorney, Agent, or Firm* — Davidson Kappel LLC

(57) ABSTRACT

A press hardening method including the following steps: A. the provision of a steel sheet for heat treatment being optionally coated with a zinc- or aluminum-based pre-coating, B. the flexible rolling of the steel sheet in the rolling direction so as to obtain a steel sheet having a variable thickness, C. the cutting of the rolled steel sheet to obtain a tailored rolled blank, D. the deposition of a hydrogen barrier pre-coating over a thickness from 10 to 550 nm, E. the heat treatment of the tailored rolled blank to obtain a fully austenitic microstructure in the steel, F. the transfer of the tailored rolled blank into a press tool, G. the hot-forming of the tailored rolled blank to obtain a part having a variable thickness, H. the cooling of the part having a variable thickness obtained at step G).

19 Claims, No Drawings

(56) References Cited

FOREIGN PATENT DOCUMENTS

| | | | | |
|---|---|---|---|---|
| EP | 2778247 | | 9/2014 | |
| EP | 2944706 | A1 | 11/2015 | |
| EP | 2984198 | A1 | 2/2016 | |
| EP | 3056591 | A1 | 8/2016 | |
| EP | 3094756 | A1 | 11/2016 | |
| EP | 3329029 | A1 | 6/2018 | |
| EP | 3396010 | A1 | 10/2018 | |
| EP | 3438316 | A1 | 2/2019 | |
| EP | 3175006 | B1 | 3/2019 | |
| EP | 3 521481 | A1 | 8/2019 | |
| EP | 2893047 | B1 | 4/2020 | |
| JP | 2018528324 | A | 9/2018 | |
| JP | 2019518136 | A | 6/2019 | |
| KR | 20130099042 | A | 9/2013 | |
| WO | WO-2017017513 | A1 * | 2/2017 | ............ B32B 15/01 |
| WO | WO2017/187255 | | 11/2017 | |
| WO | WO 2018/158166 | A1 | 9/2018 | |
| WO | WO2020/070545 | | 4/2020 | |
| WO | WO 2021/081377 | A1 | 5/2021 | |
| WO | WO2021/084376 | A1 | 5/2021 | |
| WO | WO 2021/084378 | A1 | 5/2021 | |
| WO | WO 2021/084379 | A1 | 5/2021 | |

OTHER PUBLICATIONS

Written Opinion of PCT/IB2020/059838.
Search Report of PCT/IB2020/059837 dated Sep. 12, 2020.
Written Opinion of PCT/IB2020/059837.
Windmann M et al, "Formation of intermetallic phases in Al-coated hot-stamped 22MnB5 sheets in terms of coating thickness and Si content", Surface and Coatings Technology, (Jul. 1, 2014), vol. 246; pp. 17-25.
Search Report of PCT/IB2020/059842 dated Nov. 26, 2020.
Written Opinion of PCT/IB2020/059842.
Search Report of PCT/IB2020/059841 dated Jan. 1, 2020.
Written Opinion of PCT/IB2020/059841.

* cited by examiner

PRESS HARDENING METHOD

The invention relates to a process for manufacturing press hardened parts from a steel sheet for heat treatment with a hydrogen barrier pre-coating. These parts should have an outstanding resistance to delayed fracture while featuring also a variable thickness.

Coated steel sheets for press hardening are sometimes termed "pre-coated," this prefix indicating that a transformation of the nature of the pre-coating will take place during heat treatment before stamping. There can be more than one pre-coating. This invention discloses one pre-coating, optionally two pre-coatings.

SUMMARY OF THE INVENTION

Press hardening is known as critical for hydrogen absorption, increasing the sensitivity to delayed fracture. Absorption may occur at the austenitization heat treatment, which is the heating step prior to the hot press forming itself. The saturation of hydrogen into Steel is indeed dependent from the metallurgic phase. Furthermore, at high temperature the water in the furnace dissociates at the surface of the steel sheet into hydrogen and oxygen.

In addition, parts having a variable thickness are known to absorb more hydrogen during the austenitization heat treatment than standard parts. Parts with variable thickness are usually produced by continuous flexible rolling, a process wherein the sheet thickness obtained after rolling is variable in the rolling direction. This occurs in relationship with the load which has been applied through the rollers to the sheet during the rolling process as described in EP1074317. Flexible rolling is characterized in that the roll gap is deliberately changed during the rolling operation. The object of flexible rolling is to produce rolled sheet with a load- and weight-optimized cross section. The thickness is inherited from the rolling rate which can vary from 1 to 50%. A blank cut from a strip with variable thickness is commonly known as a tailor rolled blank.

It is an object of the present invention to provide a press hardening method wherein the hydrogen absorption into a tailored rolled blank is prevented. [The present invention also additionally or alternatively aims to make available a part having excellent resistance to delayed fracture obtainable by said press-hardening method including hot-forming.

The present disclosure provides a press hardening method comprising the following steps:
A. the provision of a sheet made of steel for heat treatment being optionally precoated with a zinc- or aluminum-based pre-coating,
B. the flexible rolling of the steel sheet in the rolling direction so as to obtain a steel sheet having a variable thickness,
C. the cutting of the rolled steel sheet to obtain a tailored rolled blank,
D. the deposition of a hydrogen barrier pre-coating over a thickness from 10 to 550 nm,
E. the heat treatment of the tailored rolled blank to obtain a fully austenitic microstructure in the steel,
F. the transfer of the tailored rolled blank into a press tool,
G. the hot-forming of the tailored rolled blank to obtain a part having a variable thickness,
H. the cooling of the part having a variable thickness obtained at step G) to obtain a microstructure in steel being martensitic or martensito-bainitic or made of at least 75% in terms of volume fraction of equiaxed ferrite, from 5 to 20% in volume of martensite and of bainite in amount less than or equal to 10% in volume.

Indeed, the inventors have surprisingly found that when the steel sheet is pre-coated with a hydrogen barrier pre-coating after the flexible rolling and before the thermal treatment, the barrier effect of the pre-coating is highly improved, preventing even more the absorption of hydrogen into the steel sheet.

Moreover, it seems that during the thermal treatment, thermodynamically stable oxides are formed on the surface of the barrier pre-coating with a low kinetic. These thermodynamically stable oxides further reduce hydrogen absorption.

In step A), the steel sheet used is made of steel for heat treatment as described in the European Standard EN 10083. It can have a tensile resistance superior to 500 MPa, advantageously between 500 and 2000 MPa before or after heat-treatment.

The weight composition of steel sheet is preferably as follows: 0.03%≤C≤0.50% ; 0.3%≤Mn≤3.0% ; 0.05%≤Si≤0.8% ; 0.015%≤Ti≤0.2% ; 0.005%≤Al≤0.1% ; 0%≤Cr≤2.50% ; 0%≤S≤0.05% ; 0%≤P≤0.1% ; 0%≤B≤0.010% ; 0%≤Ni≤2.5% ; 0%≤Mo≤0.7% ; 0%≤Nb≤0.15% ; 0%≤N≤0.015% ; 0%≤Cu≤0.15% ; 0%≤Ca≤0.01% ; 0%≤W≤0.35%, the balance being iron and unavoidable impurities from the manufacture of steel.

For example, the steel sheet is 22MnB5 with the following composition: 0.20%≤C≤0.25%; 0.15%≤Si≤0.35%; 1.10%≤Mn≤1.40%; 0%≤Cr≤0.30%; 0%≤Mo≤0.35%; 0%≤P≤0.025%; 0%≤S≤0.005%; 0.020%≤Ti≤0.060%; 0.020%≤Al≤0.060%; 0.002%≤B≤0.004%, the balance being iron and unavoidable impurities from the manufacture of steel.

The steel sheet can be Usibor® 2000 with the following composition: 0.24%≤C≤0.38%; 0.40%≤Mn≤3%; 0.10%≤Si≤0.70%; 0.015%≤Al≤0.070%; 0%≤Cr≤2%; 0.25≤Ni≤2%; 0.020%≤Ti≤0.10%; 0%≤Nb≤0.060%; 0.0005%≤B≤0.0040%; 0.003%≤N≤0.010%; 0.0001%≤S≤0.005%; 0.0001%≤P≤0.025%; it being understood that the contents of titanium and nitrogen satisfy Ti/N>3.42; and that the contents of carbon, manganese, chromium and silicon satisfy:

$$2.6C + \frac{Mn}{5.3} + \frac{Cr}{13} + \frac{Si}{15} \geq 1.1\%$$

the composition optionally comprising one or more of the following: 0.05% Mo≤Mo≤0.65%; 0.001%≤W≤0.30%; 0.0005%≤Ca≤0.005%, the balance being iron and unavoidable impurities from the manufacture of steel.

The Steel sheet can be Ductibor® 500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, the balance being iron and unavoidable impurities from the manufacture of steel.

Steel sheet can be obtained by hot rolling and optionally cold rolling depending on the desired thickness, which can be for example between 0.7 and 3.0 mm.

Optionally in step A), the steel sheet can be directly topped by a zinc- or aluminum-based pre-coating for anti-corrosion purpose.

In a preferred embodiment, the zinc- or aluminum-based pre-coating is based on aluminum and comprises less than 15% Si, less than 5.0% Fe, optionally 0.1 to 8.0% Mg and optionally 0.1 to 30.0% Zn, the remainder being Al. For example, the zinc- or aluminum-based pre-coating is AluSi®.

In another preferred embodiment, the zinc- or aluminum-based pre-coating is based on zinc and comprises less than 6.0% Al, less than 6.0% of Mg, the remainder being Zn. For example, the zinc- or aluminum-based pre-coating is a zinc coating so to obtain the following product: Usibor® Gl.

The zinc- or aluminum-based pre-coating can also comprise impurities and residual elements such iron with a content up to 5.0%, preferably 3.0%, by weight.

The zinc- or aluminum-based pre-coating can be deposited by any methods known to the man skilled in the art, for example hot-dip galvanization process, roll coating, electro-galvanization process, physical vapor deposition such as jet vapor deposition, magnetron sputtering, or electron beam induced deposition.

Optionally, after the deposition of the zinc- or aluminum-based pre-coating, a skin-pass can be realized and allows work hardening the coated steel sheet and giving it a roughness facilitating the subsequent shaping. A degreasing and a surface treatment can be applied to improve for example adhesive bonding or corrosion resistance.

After the provision of the sheet steel for heat treatment, optionally pre-coated with a zinc- or aluminum-based pre-coating, the steel sheet is rolled to obtain a variable thickness.

Preferably in step B), the flexible rolling is a hot-rolling or a cold rolling step. Preferably, the rolling rate is between 1 and 50%. Then the sheet is cut to obtain a tailored rolled blank.

Optionally, in step D), the hydrogen barrier pre-coating comprises elements chosen from Sr, Sb, Pb, Ti, Ca, Mn, Sn, La, Ce, Cr, Zr or Bi, the content by weight of each additional element being inferior to 0.3% by weight.

Preferably in step D), the hydrogen barrier pre-coating comprises at least one element chosen among the followings: nickel, chromium, magnesium, aluminum and yttrium.

Preferably in step D), the hydrogen barrier pre-coating consists of nickel and chromium, i.e. the hydrogen barrier pre-coating comprises nickel, chromium and optional elements. Advantageously, the weight ratio Ni/Cr is between 1.5 and 9. Indeed, without willing to be bound by any theory it is believed that this specific ratio further decreases the hydrogen absorption during the austenitization heat treatment.

In another preferred embodiment, the hydrogen barrier pre-coating consists of nickel and aluminum, i.e. the hydrogen barrier pre-coating comprises Ni, Al and additional elements.

In another preferred embodiment, the hydrogen barrier pre-coating consists of chromium, i.e. the hydrogen barrier pre-coating comprises only Cr and additional elements.

In another preferred embodiment, the hydrogen barrier pre-coating consists of magnesium, i.e. the hydrogen barrier pre-coating comprises only Mg and additional elements.

In another preferred embodiment, the hydrogen barrier pre-coating consists of nickel, chromium, aluminum and yttrium, i.e. the hydrogen barrier pre-coating comprises Ni, Al and Y and additional elements.

In step D), the hydrogen barrier pre-coating has a thickness between 10 and 550 nm and preferably between 10 and 90 or between 150 and 250 nm. For example, the thickness of the hydrogen barrier pre-coating is of 50, 200 or 400 nm.

Without willing to be bound by any theory, it seems that when the hydrogen barrier pre-coating is below 10 nm, there is a risk that hydrogen absorbs into steel because the hydrogen barrier pre-coating does not cover enough the steel sheet. When the hydrogen barrier pre-coating is above 550 nm, it seems that there is a risk that the hydrogen barrier pre-coating becomes more brittle and that the hydrogen absorption begins due to the hydrogen barrier pre-coating brittleness.

Preferably, in step D), the steel sheet is directly topped by a zinc- or aluminum-based pre-coating before flexible rolling, this rolled zinc- or aluminum-based pre-coating layer being directly topped by the hydrogen barrier pre-coating.

Preferably, the hydrogen barrier pre-coating of step D) is deposited by physical vapor deposition, by electro-galvanization or roll-coating. Preferably, the hydrogen barrier pre-coating is deposited by electron beam induced deposition or roll coating.

A heat treatment is then applied to the tailored rolled blank in a furnace. Preferably, in step E), the atmosphere is inert or has an oxidizing power equal or higher than that of an atmosphere consisting of 1% by volume of oxygen and equal or smaller than that of an atmosphere consisting of 50% by volume of oxygen. The atmosphere may in particular be made of $N_2$ or Ar or mixtures of nitrogen or argon and gas oxidants such as, for example, oxygen, mixtures of CO and $CO_2$ or mixtures of $H_2$ and $H_2O$. It is also possible to use mixtures of CO and $CO_2$ or mixtures of $H_2$ and $H_2$ without addition of inert gas.

Preferably, in step E), the atmosphere has an oxidizing power equal or higher than that of an atmosphere consisting of 10% by volume of oxygen and equal or smaller than that of an atmosphere consisting of 30% by volume of oxygen. For example, the atmosphere is air, i.e. consisting of about 78% of $N_2$, about 21% of $O_2$ and other gas such as rare gases, carbon dioxide and methane.

Preferably, in step E), the dew point is between −30 and +30° C., more preferably −20 and +20° C. and advantageously between −15° C. and +15° C. Indeed, without willing to be bound by any theory, it is believed that when the dew point is in the above range, the layer of thermodynamically stable oxides reduce even more the $H_2$ adsorption during the heat treatment.

Preferably, the heat treatment is performed at a temperature between 800 and 970° C. More preferably, the heat treatment is performed at an austenitization temperature Tm usually between 840 and 950° C., preferably 880 and 930° C.

Advantageously, said blank is maintained during a dwell time tm between 1 and 12 minutes, preferably between 3 and 9 minutes. During the heat treatment before the hot-forming, the pre-coating forms an alloy layer having a high resistance to corrosion, abrasion, wear and fatigue.

After the heat treatment, the blank is then transferred to a hot-forming tool and hot-formed at a temperature between 600 and 830° C. The hot-forming can be the hot-stamping or the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

The part comprises a steel sheet having a variable thickness coated with a hydrogen barrier pre-coating and an oxide layer comprising thermodynamically stable oxides, such hydrogen barrier re-coating being alloyed through diffusion with the steel sheet.

Preferably, the part comprises the steel sheet directly topped by a zinc- or aluminum-based pre-coating, both having a variable thickness. This zinc- or aluminum-based pre-coating layer is directly topped by the hydrogen barrier ore-coating and an oxide layer comprising thermodynamically stable oxides. The hydrogen barrier pre-coating is alloyed by diffusion with the zinc- or aluminum-based pre-coating. The zinc- or aluminum-based pre-coating is also alloyed with the steel sheet. Without willing to be bound by any theory, it seems that iron from steel diffuses to the surface of the hydrogen barrier pre-coating during the heat treatment.

Preferably, the thermodynamically stable oxides can comprise respectively $Cr_2O_3$, FeO, NiO, $Fe_2O_3$, $Fe_3O_4$, MgO, $Y_2O_3$ or a mixture thereof.

If a zinc-based pre-coating is present, the oxides can also comprise ZnO. If an aluminum-based pre-coating is present, the oxides can also comprise $Al_2O_3$ and/or $MgAl_2O_4$.

Preferably, the part is a front rail, a seat cross member, a side sill member, a dash panel cross member, a front floor reinforcement, a rear floor cross member, a rear rail, a B-pillar, a door ring or a shotgun.

For automotive application, after a phosphating step, the part is dipped in an e-coating bath. Usually, the thickness of the phosphate layer is between 1 and 2 μm and the thickness of the e-coating layer is between 15 and 25 μm, preferably inferior or equal to 20 μm. The cataphoresis layer ensures an additional protection against corrosion. After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis layer.

The invention will now be explained in trials carried out for information only. They are not limiting.

EXAMPLES

For all samples, steel sheets used are 22MnB5. The composition of the steel is as follows: C=0.2252% ; Mn=1.1735% ; P=0.0126%, S=0.0009% ; N=0.0037% ; Si=0.2534% ; Cu=0.0187% ; Ni=0.0197% ; Cr=0.180% ; Sn=0.004% ; Al=0.0371% ; Nb=0.008% ; Ti=0.0382% ; B=0.0028% ; Mo=0.0017% ; As=0.0023% et V=0.0284%.

Some steel sheets are coated with a $1^{st}$ pre-coating called hereinafter "AluSi®". This pre-coating comprises 9% by weight of Silicon, 3% by weight of iron, the balance being aluminum. It is deposited by hot-dip galvanization.

Some steel sheets are precoated with a $2^{nd}$ pre-coating deposited by magnetron sputtering.

Example 1: hydrogen test

This test is used to determine the quantity of hydrogen adsorbed during the austenitization heat treatment of a press hardening method.

Trial 1 is a steel sheet coated with a $1^{st}$ pre-coating being AluSi® (25 μm). A flexible rolling was performed on Trial 1. Then, Trial 1 was cut to obtain a tailored rolled blank.

Trial 2 is a steel sheet precoated with a $1^{st}$ coating being AluSi® (25 μm) and a $2^{nd}$ pre-coating comprising 80% of Ni and 20% of Cr. Then, a flexible rolling was performed on Trial 2. Trial 2 was cut to obtain a tailored rolled blank. In this case, the hydrogen barrier pre-coating was deposited before the flexible rolling.

Trial 3 is a steel sheet precoated with a $1^{st}$ pre-coating being AluSi® (25 μm) and a $2^{nd}$ pre-coating comprising 80% of Ni and 20% of Cr. Trial 3 was firstly coated with the $1^{st}$ pre-coating of AluSi®. Then, a flexible rolling with a rolling of 50% was performed followed by the cutting to obtain a tailored rolled blank. After, the $2^{nd}$ pre-coating comprising 80% of Ni and 20% of Cr was deposited on Trial 3. In this case, the hydrogen barrier pre-coating was deposited after the flexible rolling.

After, all Trials were heated at a temperature of 900° C. during a dwell time varying between 5 and 10 minutes. The atmosphere during the heat treatment was air. Blanks were transferred into a press tool and hot-stamped in order to obtain parts having a variable thickness. Then, parts were cooled by dipping trials into warm water to obtain a hardening by martensitic transformation.

Finally, the hydrogen amount absorbed by the steel sheet during the heat treatment was measured by thermic desorption using a Thermal Desorption Analyzer or TDA. To this end, each trial was placed in a quartz room and heated slowly in an infra-red furnace under a nitrogen flow. The released mixture hydrogen/nitrogen was picked up by a leak detector and the hydrogen concentration was measured by a mass spectrometer.

Results are shown in the following Table 1:

| Trials | Atmosphere | $2^{nd}$ pre-coating | Deposition of $2^{nd}$ pre-coating | Ratio Ni/Cr | Thickness $2^{nd}$ pre-coating (nm) | $H_2$ amount (ppm by mass) |
|---|---|---|---|---|---|---|
| 1 | air | — | — | — | 200 | 1.1 |
| 2 | air | Ni/Cr 80/20 | Before flexible rolling | 4 | 200 | 1.05 |
| 3* | air | Ni/Cr 80/20 | After flexible rolling | 4 | 200 | 0.15 |

*example according to the invention.

Trial 3 according to the present invention releases a significantly lower amount of hydrogen.

After heat treatment and hot forming, the surface of trial 3 has been analyzed. It comprises following oxides on the surface: $Cr_2O_3$, NiO, $Fe_2O_3$, $Fe_3O_4$ and $Al_2O_3$.

From the steel sheet to the external surface, the part of trial 3 comprises the following layers:

an inter-diffusion layer comprising iron from the steel sheet, aluminum, silicon and other elements, having a thickness from 10 to 15 μm, an alloyed layer containing aluminum, silicon and iron from the steel sheet in a lesser amount than the layer below and other elements, having a thickness from 20 to 35 μm, a thin layer containing less iron and more oxides than the layers below, having a thickness from 100 to 300 nm, a thinner layer containing the highest amount of oxides compared to the layers below, especially Ni, Cr and Al oxides, and located directly below the surface, having a thickness from 50 to 150 nm.

What is claimed is:

1. A press hardening method comprising the following steps:
    A. providing a steel sheet for heat treatment, the steel sheet being optionally coated with a zinc-based pre-coating or an aluminum-based pre-coating;
    B. flexible rolling the steel sheet in a rolling direction so as to obtain a steel sheet having a variable thickness;
    C. cutting the rolled steel sheet to obtain a tailored rolled blank;
    D. depositing a hydrogen barrier pre-coating with a thickness from 10 to 550 nm, the hydrogen barrier pre-coating consisting of nickel and chromium;
    E. heat treating the tailored rolled blank to obtain a fully austenitic microstructure in the steel sheet;
    F. transferring the tailored rolled blank into a press tool;
    G. hot-forming the tailored rolled blank to obtain a part having a variable thickness;
    H. cooling of the part obtained in step G to obtain a microstructure in steel being (i) martensitic or (martensito-bainitic or (made of at least 75% in terms of volume fraction of equiaxed ferrite, from 5 to 20% in volume of martensite and of bainite in amount less than or equal to 10% in volume.

2. The press hardening method as recited in claim 1 wherein in step A, the aluminum-based pre-coating is present and comprises less than 15% Si and less than 5.0% Fe, optionally 0.1 to 8.0% Mg and optionally 0.1 to 30.0% Zn, a remainder being Al.

3. The press hardening method as recited in claim 1 wherein in step A, the zinc-based pre-coating is present and and comprises less than 6.0% Al and less than 6.0% of Mg, a remainder being Zn.

4. The press hardening method as recited in claim 1 wherein in step B, the flexible rolling is a hot-rolling or a cold-rolling step.

5. The press hardening method as recited in claim 1 wherein in step D, the hydrogen barrier pre-coating consists of nickel and chromium where a weight ratio Ni/Cr is between 1.5 and 9.

6. The press hardening method as recited in claim 1 wherein the hydrogen barrier pre-coating of step D is deposited by physical vapor deposition, by electro-galvanization or by roll-coating.

7. The press hardening method as recited in claim 1 wherein in step E, the heat treating is at an atmosphere that (i) is inert or (ii) has an oxidizing power equal or higher than that of an atmosphere consisting of 1% by volume of oxygen and equal or smaller than that of an atmosphere consisting of 50% by volume of oxygen.

8. The press hardening method as recited in claim 1 wherein in step E, the heat treating is at a temperature between 80° and 970° C.

9. The press hardening method as recited in claim 1 wherein in step E, the heat treating is performed for a dwell time of 1 to 12 minutes.

10. The press hardening method as recited in claim 1 wherein in step G, the hot-forming is performed at a temperature between 60° and 830° C.

11. The press hardening method as recited in claim 1 wherein in step D, the thickness is between 10 and 90 nm.

12. The press hardening method as recited in claim 1 wherein in step D, the thickness is between 150 and 250 nm.

13. The press hardening method as recited in claim 1 wherein in step D, the hydrogen barrier pre-coating consists of 80% nickel and 20% chromium by weight.

14. The press hardening method as recited in claim 1, wherein, in step D, the hydrogen barrier pre-coating is applied by magnetron sputtering.

15. The press hardening method as recited in claim 1, wherein the microstructure is mostly martensitic.

16. The press hardening method as recited in claim 1, wherein in step B, the flexible rolling is at a rolling rate between 1% and 50%.

17. The press hardening method as recited in claim 16, wherein in step B, the flexible rolling is at a rolling rate of 50%.

18. The press hardening method as recited in claim 7 wherein in step E, the atmosphere has a dew point from −30 to +30° C.

19. The press hardening method as recited in claim 15, wherein in step B, the flexible rolling is at a rolling rate between 1% and 50%.

* * * * *